(12) United States Patent
Grandin

(10) Patent No.: US 6,742,506 B1
(45) Date of Patent: Jun. 1, 2004

(54) COMBUSTION ENGINE HAVING EXHAUST GAS RECIRCULATION

(75) Inventor: Börje Grandin, Alvsjo (SE)

(73) Assignee: Saab Automobile AB (SE)

( * ) Notice: Subject to any disclaimer, the term of this patent is extended or adjusted under 35 U.S.C. 154(b) by 153 days.

(21) Appl. No.: 10/019,608
(22) PCT Filed: Jun. 29, 2000
(86) PCT No.: PCT/SE00/01379
§ 371 (c)(1), (2), (4) Date: Dec. 28, 2001
(87) PCT Pub. No.: WO01/00981
PCT Pub. Date: Jan. 4, 2001

(30) Foreign Application Priority Data

Jun. 30, 1999 (SE) .............................................. 9902491

(51) Int. Cl.[7] .............................................. F02B 47/08
(52) U.S. Cl. ................................. 123/568.12; 123/568.2
(58) Field of Search ..................... 123/568.11, 568.12, 123/568.2; 60/605.2

(56) References Cited

U.S. PATENT DOCUMENTS 5,740,786 A * 4/1998 Gartner .................. 123/568.12
5,794,445 A * 8/1998 Dungner .................... 60/605.2
6,484,500 B1 * 11/2002 Coleman et al. ............... 60/612
6,553,763 B1 * 4/2003 Callas et al. ................ 60/605.2
6,604,361 B2 * 8/2003 Buckland et al. .......... 60/605.2

FOREIGN PATENT DOCUMENTS

| SE | 506515 | 12/1997 |
| SE | 506881 | 2/1998 |
| SE | 510155 | 4/1999 |
| SE | WO9960259 | * 11/1999 |

* cited by examiner

Primary Examiner—Mahmoud Gimie
(74) Attorney, Agent, or Firm—Ostrolenik, Faber, Gerb & Soffen, LLP

(57) ABSTRACT

A combustion engine having an exhaust-gas driven turbo compressor is provided with a device for recirculating exhaust gases to the engine, this device being connected to the exhaust system of the engine upstream of the turbo compressor and being provided with a cooling device for the recirculated exhaust gases. The engine is provided with at least two exhaust valves per cylinder and has divided exhaust gas flow, each cylinder being connected by a first exhaust valve to a first exhaust collector, which leads to the turbine of the turbo compressor, and each cylinder being connected by a second exhaust valve to a second exhaust collector, which is connected to the exhaust system of the engine downstream of the turbine. The second exhaust collector forms part of the device for recirculating exhaust gases to the engine and is also connected to the inlet of the engine.

16 Claims, 1 Drawing Sheet

COMBUSTION ENGINE HAVING EXHAUST GAS RECIRCULATION

BACKGROUND OF THE INVENTION

Figure 1:
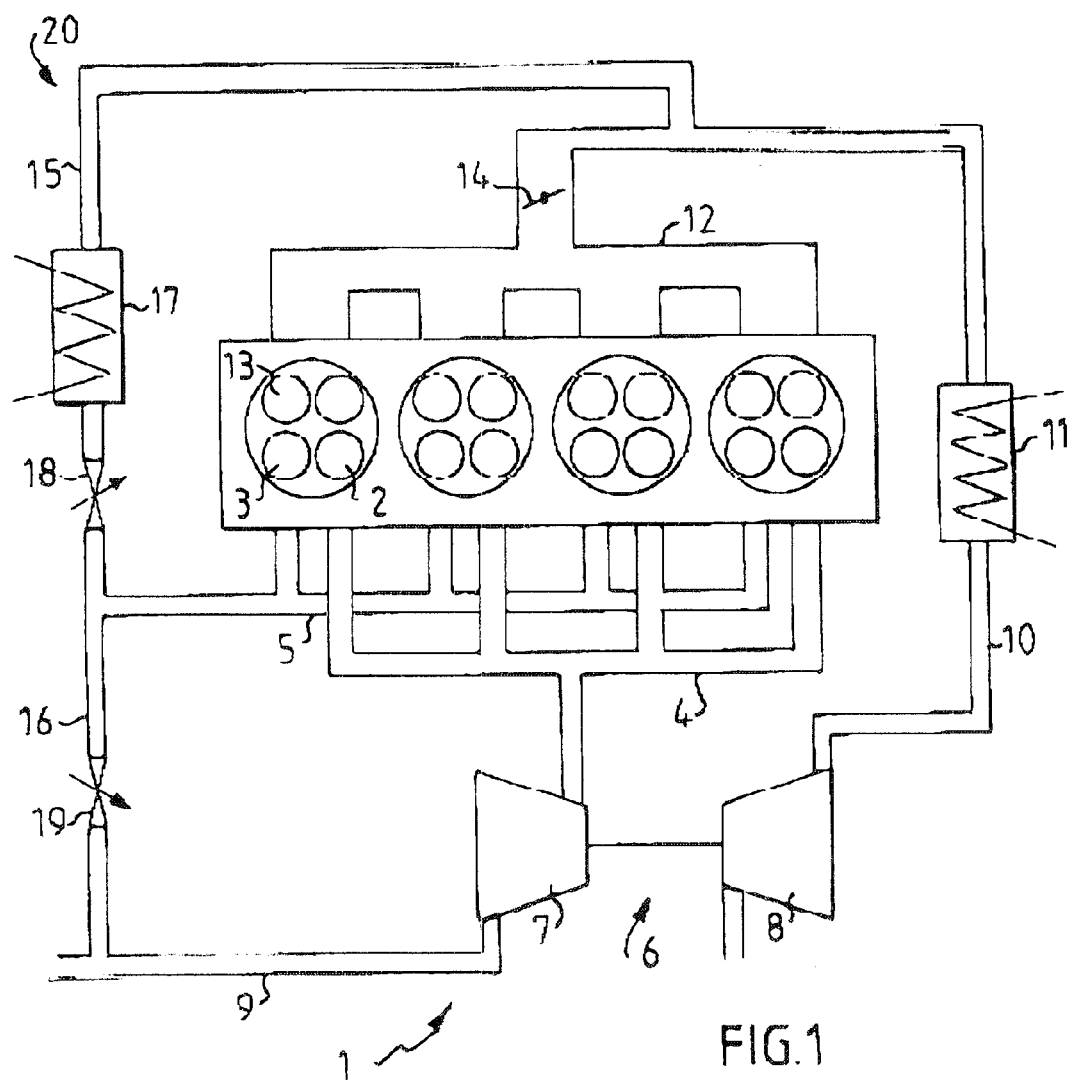

Within the field of automotive engineering, it is becoming increasingly common to use turbo-charged engines, i.e. engines in which supercharging takes place with the aid of a compressor driven by an exhaust-gas-driven turbine. At high power a greater 15 charge is used than in a normal engine. In order to avoid knocking and excessively high combustion pressure, the charging pressure is limited and the ignition effected relatively late. This means, in turn, that the opportunity for the burnt gases to expand is small, at the same time as the drop in temperature during expansion does not amount to very much. The temperature of the exhaust gas therefore becomes high. The problems are aggravated by the fact that the share of residual gases in the cylinder is high, with accompanying heating of a new charge and the risk of premature ignition thereof. In order to obtain, as far as possible, a manageable exhaust-gas temperature, it is customary, where the power take-off is high, to use a rich mixture for the engine, with surplus fuel as cooling medium in the cylinder.

The phenomenon of knocking under high load is associated with the fact that a certain part of the charge is self-ignited before the flame front has reached this part of the charge. The result is a very rapid combustion and a pressure wave, or knocking. The final temperature in the cylinder is dependent upon the initial temperature, so that it is desirable for the initial temperature to be as low as possible. One problem in this connection is however that it is difficult to empty the cylinder of hot residual gases, whereby these gases raise the initial temperature and thereby reduce the prospect of pressure increase and power take-off.

It is previously known to use exhaust-gas, recirculation in a turbo engine to render knocking more difficult. Between the conventional exhaust collector and the exhaust-gas turbine, exhaust gases have been drawn off, and, after cooling, recirculated to the engine. A drawback with this solution is that the pressure in the exhaust collector increases when the recirculated gases component increases, whereby the proportion of hot residual gases in the cylinder also increases, so that the temperature in the cylinder prior to compression cannot be lowered to the desired extent.

SUMMARY OF THE INVENTION

The object of the invention is to achieve a turbo engine which has improved characteristics, especially under high load. A further object is to achieve this with as simple means as possible.

The object of the invention is achieved by the construction of a combustion engine defined in the introduction and having the distinguishing features defined in Patent claim 1.

As a result of the chosen construction with divided exhaust-gas flow, it is possible, especially under high load, to achieve a more effective emptying of the cylinder, thereby enabling a greater quantity of cooled exhaust gases to be recirculated. The temperature in the cylinder prior to compression can therefore be lowered to a level which has not hitherto been possible. This in combination with the fact that the exhaust gases lower the combustion rate means that the power take-off can be improved. In addition, there is better utilization of fuel by virtue of the fact that fuel does not need to be injected in excess for use as a cooling medium, as has previously been the case.

With the aid of the proposed control valves proposed according to the invention, it is possible, if so desired, to control the exhaust-gas recirculation in different ways in order to obtain the desired engine characteristics. It can be desirable, for example, to open the control valve which allows exhaust-gas recirculation gradually, at the same time as the second control valve is closed gradually. Other variants are also possible, depending upon how the engine is required to respond under, for example, different loads.

It is also conceivable to control the engine valves in such a way that they open and close in different ways under different types of load, possibly in combination with the said control valves being controlled in a certain manner.

The fact that knocking is made more difficult not only yields advantages from a functional aspect, but also reduces the risk of damage to the engine.

Further distinguishing features and advantages of the solution according to the invention can be derived from the description and the other patent claims.

The invention will be described in greater detail below with reference to an illustrative embodiment shown in the drawing.

Other features and advantages of the present invention will become apparent from the following description of the invention which refers to the accompanying drawings.

BRIEF DESCRIPTION OF THE DRAWING(S)

FIG. 1 shows a combustion engine according to the invention.

DETAILED DESCRIPTION OF PREFERRED EMBODIMENTS OF THE INVENTION

FIG. 1 shows in diagrammatic representation a multi-cylinder combustion engine 1 according to the invention, which is constructed as an Otto engine. The cylinders of the engine each have at least two exhaust valves 2 and 3. From the first exhaust valves 2 of the cylinders, exhaust gas is led out to a first exhaust collector 4, which is common to the cylinders, and from the second exhaust valves 3 of the cylinders, the exhaust gas is led out to a second exhaust collector 5, which is common to the cylinders.

The engine 1 is equipped, for supercharging with the aid of an exhaust-gas-driven turbo compressor 6, with a turbine 7 and a compressor 8 driven by the said turbine. The exhaust-gas turbine 7 is fed from the 25 first exhaust collector 4 and is connected by an exhaust pipe 9 to a conventional catalyzer and one or more silencer(s) (not shown here). The outlet of the compressor 8 is connected by a pipe 10 containing a cooler 11 to the induction pipe 12 of the engine, from where the engine is fed via at least one inlet valve 13 per cylinder. The air quantity to the engine is regulated with a throttle valve 14. The second exhaust collector 5 is connected by a pipe 15 to the inlet of the engine and is connected by a pipe 16 to the exhaust pipe. In the pipe 15 there is an exhaust cooler 17 and upstream of this a first control valve 18. A second control valve 19 is disposed in the pipe 16.

The exhaust valves 2 and 3 of the engine open and close in a known manner at different times, the exhaust valves 2 opening at the start of the exhaust stroke and the exhaust valves 3 at the end of the exhaust stroke. This has the effect that the strong exhaust-gas pulse at the start of the exhaust stroke is used to drive the turbine 7. Whilst the low-pressure part of the exhaust-gas pulse is led out via the second exhaust collector 5 once the exhaust valves 2 have closed the connection to the first exhaust collector 4.

The second exhaust collector 5 and the pipe 15 form an EGR device 20. i.e. a device for recirculation of exhaust gases to the engine, this EGR device therefore being connected to the exhaust system of the engine upstream of the turbo compressor 6.

The engine 1 according to the invention functions as follows:

When the engine is under low load, the power requirement is small. The outlet from the second exhaust collector 5 is kept totally closed by the control valves 18 and 19 both being kept closed. As a 25 result of the inlet valves 13 already opening whilst the exhaust valve 3 is still open and before the piston has reached its upper dead-centre position, a part of the exhaust gases is forced to remain in the cylinder. The exhaust valve is already closed at this stage, so that pump losses resulting from high pressure in first exhaust collector 4 are eliminated.

When the engine is under medium load, the inlet pressure can lie approximately within the range 80–110 kPa. Within this load range, it is important to have good volumetric efficiency and a rapid combustion. This is achieved by the control valve 18 remaining closed whilst the control valve 19, by contrast, opens. Exhaust gases in the second exhaust collector 5 can now therefore, via the pipe 16, flow out in the exhaust pipe 9. This allows each cylinder to be effectively emptied of exhaust gases, apart from in those cases where the inlet pressure is less than the atmospheric pressure, when a small quantity of exhaust gases remains in the cylinder.

When the engine is under high load, with higher inlet pressure than above, the engine is run with an additional contribution of a relatively largo quantity of cooled exhaust gases. This is achieved by the control valve 18 being opened and the control valve 19 being closed. Hot residual gases which have not flowed out from the cylinder and onward to the turbine 7 can now flow out in the second exhaust collector 5 and from there, after cooling in the exhaust cooler 17, be returned to the engine. The gas temperature in the cylinder can consequently be lowered prior to compression and, in addition a slower combustion is made possible. This allows, in turn, a better power take-off from the engine, with reduced risk of knocking. As a result of the last remnants of gas from the cylinder being returned to the engine, unburnt HC products are prevented from escaping into the atmosphere, which is advantageous from the environmental aspect. The engine can now be run stoichiometrically even under high load, the quantity of discharged pollutants being able to be kept under control with the aid of a conventional three-way catalyzer.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A combustion engine, comprising:
    an inlet;
    a plurality of cylinders, each of the cylinders including at least one intake valve coupled to the inlet and at least two exhaust valves for divided exhaust gas flow, the exhaust valves including a first exhaust valve operable to open at the beginning of an exhaust stroke of the cylinder and a second exhaust valve operable to open at an end of the exhaust stroke of the cylinder;
    first and second exhaust collectors coupled to the first and second exhaust valves, respectively, for receiving exhaust gases from the cylinders;
    an exhaust-gas-driven turbo compressor coupled to the first exhaust collector for supercharging the engine; and
    a recirculating device for recirculating the exhaust gases, the recirculating device including a cooling device coupled to the second exhaust collector for cooling the exhaust gases and coupled to the inlet of the engine to permit the cooled exhaust gas to recirculate into the cylinders through the intake valves; the recirculating device further including a first control valve for regulating a quantity of the recirculated exhaust gases from the second exhaust collector, the cooling device being coupled to the second exhaust collector via the first control valve, wherein the first control valve is operable to be opened under a high engine load and operable to remain closed below a high engine load.

2. The combustion engine according to claim 1, further comprising an exhaust pipe coupled to and arranged downstream of the exhaust-gas-driven turbo compressor and a second control valve disposed in a connection between the second exhaust collector and the exhaust pipe.

3. The combustion engine according to claim 2, wherein the second control valve is operable to be closed under low and high engine loads and operable to be open between low and high engine loads.

4. The combustion engine according to claim 1, further comprising a throttle valve positioned within the inlet, the recirculating device being connected to the inlet of the engine upstream of the throttle valve.

5. A combustion engine, comprising:
    an inlet;
    a plurality of cylinders, each of the cylinders including at least one intake valve coupled to the inlet and at least two exhaust valves for divided exhaust gas flow, the exhaust valves including a first exhaust valve operable to open at the beginning of an exhaust stroke of the cylinder and a second exhaust valve operable to open at an end of the exhaust stroke of the cylinder;
    first and second exhaust collectors coupled to the first and second exhaust valves, respectively, for receiving exhaust gases from the cylinders;
    an exhaust-gas-driven turbo compressor coupled to the first exhaust collector for supercharging the engine;
    a recirculating device for recirculating the exhaust gases, the recirculating device including a cooling device coupled to the second exhaust collector for cooling the exhaust gases and coupled to the inlet of the engine to permit the cooled exhaust gas to recirculate into the cylinders through the intake valves; the recirculating device further including a first control valve for regulating a quantity of the recirculated exhaust gases from the second exhaust collector, the cooling device being coupled to the second exhaust collector via the first control valve;
    an exhaust pipe coupled to and arranged downstream of the exhaust-gas-driven turbo compressor; and
    a second control valve arranged between the second exhaust collector and the exhaust pipe downstream of the exhaust-gas-driven turbo compressor.

6. The combustion engine according to claim 5, wherein the second control valve is operable to be closed under low and high engine loads and operable to be open between low and high engine loads.

7. The combustion engine according to claim 6, wherein the second control valve is operable to be open only when a pressure in the inlet of the engine is from about 80–110 kPa.

8. The combustion engine according to claim 5, further comprising a throttle valve positioned within the inlet, the recirculating device being connected to the inlet of the engine upstream of the throttle valve.

9. The combustion engine according to claim 6, further comprising a throttle valve positioned within the inlet, the recirculating device being connected to the inlet of the engine upstream of the throttle valve.

10. The combustion engine according to claim 7, further comprising a throttle valve positioned within the inlet, the recirculating device being connected to the inlet of the engine upstream of the throttle valve.

11. A combustion engine, comprising:
    an inlet;
    a throttle valve positioned within the inlet;
    a plurality of cylinders, each of the cylinders including at least one intake valve coupled to the inlet and at least two exhaust valves for divided exhaust gas flow, the exhaust valves including a first exhaust valve operable to open at the beginning of an exhaust stroke of the cylinder and a second exhaust valve operable to open at an end of the exhaust stroke of the cylinder;
    first and second exhaust collectors coupled to the first and second exhaust valves, respectively, for receiving exhaust gases from the cylinders;
    an exhaust-gas-driven turbo compressor coupled to the first exhaust collector for supercharging the engine; and
    a recirculating device for recirculating the exhaust gases, the recirculating device including a cooling device coupled to the second exhaust collector for cooling the exhaust gases and coupled to the inlet of the engine to permit the cooled exhaust gas to recirculate into the cylinders through the intake valves, the recirculating device being connected to the inlet of the engine upstream of the throttle valve.

12. A combustion engine, comprising:
    an inlet;
    a plurality of cylinders, each of the cylinders including at least one intake valve coupled to the inlet and at least two exhaust valves for divided exhaust gas flow, the exhaust valves including a first exhaust valve operable to open at the beginning of an exhaust stroke of the cylinder and a second exhaust valve operable to open at an end of the exhaust stroke of the cylinder;
    first and second exhaust collectors coupled to the first and second exhaust valves, respectively, for receiving exhaust gases from the cylinders;
    an exhaust-gas-driven turbo compressor coupled to the first exhaust collector for supercharging the engine; and
    a recirculating device for recirculating the exhaust gases, the recirculating device including a cooling device coupled to the second exhaust collector for cooling the exhaust gases and coupled to the inlet of the engine to permit the cooled exhaust gas to recirculate into the cylinders through the intake valves; wherein the exhaust valves have assigned thereto respective mutually variable valve times for regulating a quantity of the recirculated exhaust gases.

13. The combustion engine according to claim 12, wherein the respective mutually variable valve times of the exhaust valves are variable as a function of engine load.

14. A combustion engine, comprising:
    an inlet;
    a throttle valve positioned within the inlet;
    a plurality of cylinders, each of the cylinders including at least one intake valve coupled to the inlet and at least two exhaust valves for divided exhaust gas flow, the exhaust valves including a first exhaust valve operable to open at the beginning of an exhaust stroke of the cylinder and a second exhaust valve operable to open at an end of the exhaust stroke of the cylinder;
    first and second exhaust collectors coupled to the first and second exhaust valves, respectively, for receiving exhaust gases from the cylinders;
    an exhaust-gas-driven turbo compressor coupled to the first exhaust collector for supercharging the engine; and
    a recirculating device for recirculating the exhaust gases, the recirculating device including a cooling device coupled to the second exhaust collector for cooling the exhaust gases and coupled to the inlet of the engine to permit the cooled exhaust gas to recirculate into the cylinders through the intake valves, wherein the recirculating device is connected to the inlet of the engine upstream of the throttle valve.

15. A combustion engine, comprising:
    an inlet;
    a plurality of cylinders, each of the cylinders including at least one intake valve coupled to the inlet and at least two exhaust valves for divided exhaust gas flow, the exhaust valves including a first exhaust valve operable to open at the beginning of an exhaust stroke of the cylinder and a second exhaust valve operable to open at an end of the exhaust stroke of the cylinder;
    first and second exhaust collectors coupled to the first and second exhaust valves, respectively, for receiving exhaust gases from the cylinders;
    an exhaust-gas-driven turbo compressor coupled to the first exhaust collector for supercharging the engine; and
    a recirculating device for recirculating the exhaust gases, the recirculating device including a cooling device coupled to the second exhaust collector for cooling the exhaust gases and coupled to the inlet of the engine to permit the cooled exhaust gas to recirculate into the cylinders through the intake valves.

16. The combustion engine according to claim 15, wherein the recirculating device includes a first control valve for regulating a quantity of the recirculated exhaust gases from the second exhaust collector, the cooling device being coupled to the second exhaust collector via the first control valve.

\* \* \* \* \*